3,262,888
PROCESS FOR PREPARING THE ORGANOMETAL-
LIC COMPONENT OF A CATALYTIC SYSTEM
Giorgio Moretti, Francesco Dini, and Vincenzo D'Ales-
sandro, Milan, Italy, assignors to Montecatini Società
Generale per l'Industria Mineraria e Chimica, Milan,
Italy, a corporation of Italy
No Drawing. Filed Nov. 7, 1961, Ser. No. 150,633
Claims priority, application Italy, Nov. 11, 1960,
19,466/60
3 Claims. (Cl. 252—431)

The present invention relates to a process for preparing the organometallic component of a catalytic system suitable for use in the polymerization of alpha-olefins.

The present invention also relates to a process for polymerizing alpha-olefins to polymers having a high isotactic content carried out in the presence of a catalytic system containing said organometallic component.

Processes for polymerizing alpha-olefins to high polymers having a high isotactic polymer content with the use of catalytic systems obtained by reacting crystalline solid transition metal compounds and diethyl beryllium, preferably in the presence of substances, such as alkyl aluminum etherates, having a protective activity against traces of impurities, are known.

The preparation of alkyl beryllium compounds used in these polymerization processes, however, has heretofore been possible only with methods not too applicable to commercial scale operations.

Thus, for instance, a process for preparing diethyl beryllium, which is the best known alkyl beryllium (J. Goubeau and B. Rodewald, Z. anorg. Chem. 258, 162 (1949)), using anhydrous $BeCl_2$ and ethyl magnesium bromide in an ether solvent, is known. The presence of large amounts of solvent in the operating cycle, the necessity of carrying out a distillation under high vacuum in order to avoid the decomposition of the product, and the use of Grignard reactives which are not readily and cheaply commercially available, render this process unsuitable for operation on a commercial scale.

It has now been surprisingly found that for the purpose of polymerizing alpha-olefins to polymers with a high isotactic content, it is not necessary to prepare separately, as has been done heretofore, the triethyl aluminium etherate for admixture with diethyl beryllium in order to form the organometallic component of the catalytic system. It has been found that it is sufficient to add to the mixture containing the desired ratio of triethyl aluminium and diethyl beryllium an amount of ether stoichiometrically corresponding to the triethyl aluminium therein present (1 mole/1 mole).

The compound thus obtained can be used successfully as the organometallic component in a catalytic system for the stereo-specific polymerization of alpha-olefins.

An object of the present invention is therefore to provide a process for preparing the organometallic component of a catalytic system suitable for the promotion of the polymerization of alpha-olefins to polymers having a high isotactic content.

A further object of the present invention is to provide a process for the stereo-specific polymerization of alpha-olefins such as propylene, butene-1, etc., in the presence of a catalytic system containing a transition metal halide and an organometallic component consisting of diethyl beryllium and triethyl aluminium etherate.

Other objects and advantages will become apparent from the following description.

The organometallic component can be obtained, according to the present invention, by alkylating an anhydrous beryllium chloride with triethyl aluminium and then either adding to the final reaction products an amount of ethyl ether stoichiometrically corresponding to the organic aluminium compound present, or by removing the excess ether of the above stoichiometric amount in cases where the alkylation was carried out in an ether medium.

The alkylation reaction is rather rapid and leads to a state of equilibrium. The degree of alkylation of $BeCl_2$ depends strictly on the $Al(C_2H_5)_3/BeCl_2$ molar ratio.

Moreover, it has been found that upon using a molar ratio below 1:1, a semi-alkylation reaction almost exclusively takes place:

$$BeCl_2 + Al(C_2H_5)_3 \rightarrow ClBeC_2H_5 + ClAl(C_2H_5)_2 \quad (1)$$

The $Be(C_2H_5)Cl$, which is normally solid, separates as a precipitate when the reaction mixture, which has an Al/Be molar ratio $\leq 1$, is distilled under a high vacuum in order to separate the organometallic aluminium derivatives. The composition of this compound is confirmed by an analytical determination of the Cl and Be content and by analysis of the gases which are evolved upon decomposition with $H_2O$, which gases consist essentially of ethane.

Above an Al/Be molar ratio of 1:1, the amount of $Be(C_2H_5)_2$ thus formed increases progressively and practically complete degrees of conversion are obtained with a sufficient excess of $Al(C_2H_5)_3$, e.g., with an Al/Be molar ratio of 5:1.

The separation of $Be(C_2H_5)_2$ thus produced from the organometallic aluminium compounds, however, presents difficulties due to the known tendency of $Be(C_2H_5)_2$ to decompose upon heating. It would therefore normally be necessary to have recourse to distillation under a very high vacuum, which distillation is often difficult to achieve commercially. However, for the reasons mentioned above, this separation is not necessary in the present case. Diethyl aluminium monochloride etherate being perfectly equivalent with regard to the cited protective action in the polymerization of alpha-olefins to the triethyl aluminium etherate, it is sufficient to add, at the end of the reaction, the required stoichiometric amount of an ether (such as diethylether, dipropylether, dibutylether, tetrahydrofuran, etc.) with respect to the organic aluminium compounds present, in order to obtain a mixture of $Be(C_2H_5)_2$ and alkyl aluminium etherates having the desired properties.

It is evident that by operating in this manner, reaction mixtures with Al/Be molar ratios lower than 5 cannot be obtained.

It is however possible to reduce this ratio to less than one half this value by operating according to a two-stage process. It has in fact been found that, if the semi-alkylation of $BeCl_2$ with $Al(C_2H_5)_3$ is carried out with a molar ratio of 1:1, according to the above reaction (1) and if the diethyl aluminium monochloride thus formed is then distilled off under reduced pressure (the $ClBeC_2H_5$ being stable under these conditions), it is possible to alkylate the residual $ClBeC_2H_5$ with further amounts of $Al(C_2H_5)_3$ according to the following reaction:

$$ClBeC_2H_5 + Al(C_2H_5)_3 \rightarrow Be(C_2H_5)_2 + ClAl(C_2H_5)_2 \quad (2)$$

In this case it is also necessary to employ an excess of $Al(C_2H_5)_3$, but here, to obtain a sufficiently high degree of conversion, an excess of 100% is sufficient, i.e., the use of a minimum Al/Be ratio (in the second stage) of 2:1. This Al/Be ratio of 2:1 (or higher) is the ratio later found to be present in the final mixture after the addition to this reaction mixture of 1 mole of ether per mole of organic aluminum compound present therein.

All these reactions are preferably carried out in a concentrated medium so as to increase the reaction rate, and at temperatures of 20° to 120° C., preferably between 50° and 100° C.

It is possible, however, to carry out the alkylations in the presence of solvents which are inert under the reaction conditions. Solvents such as aromatic, saturated aliphatic hydrocarbons, cycloaliphatics or ethers, which are, if desired, partly or wholly separable at the end reaction, may be employed. As examples of such solvents may be mentioned propane, butane, pentane, hexane, heptane, cyclohexane, benzene, toluene, xylene, etc.

A further method for preparing mixtures containing diethyl beryllium and organic aluminium compounds, suitable for the aforementioned polymerization processes, has also surprisingly been found.

It has been found that ethyl beryllium chloride obtainable according to above reaction (1), either with or without the separation of the excess organic aluminium compounds, can be dehalogenated by using metal hydrides, especially alkali metal hydrides, such as NaH LiH and KH, according to the following reaction:

$$ClBeC_2H_5 + MeH \rightarrow HBeC_2H + MeCl \qquad (3)$$

wherein Me is an alkali metal.

There is thereby obtained ethyl beryllium hydride and finely divided alkali metal chloride, which is easily separable.

Upon successive direct contact of the alkyl-beryllium hydride with ethylene under a pressure of from 1 to 20 atmospheres and at a reaction temperature between 20° C. and 100° C., preferably between 50° C. and 100° C., Be $C_2H_5)_2$ is formed in a practically quantitative yield.

The above reaction (3) may be carried out in a liquid solvent, such as ether, or a dispersant, such as a saturated aliphatic or an aromatic hydrocarbon, in which the $ClBeC_2H_5$ is scarcely soluble and the alkali metal hydride is insoluble. For this reason the reaction thereby takes place in heterogeneous phase and the reaction rate, even at the higher temperatures, is rather low.

Furthermore, it has been found that the addition of $Al(C_2H_5)_3$ causes the formation of a 1:1 molecular complex with NaH. The NaH is thereby solubilized in a form which is still active as regards the dehalogenation, thus rendering the reaction mixture partly or wholly homogeneous and increasing the reaction rate itself.

It has also been found that the use of a stoichiometric amount of $Al(C_2H_5)_3$ with respect to NaH is not necessary according to the following reaction:

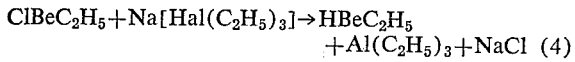

$$ClBeC_2H_5 + Na[Hal(C_2H_5)_3] \rightarrow HBeC_2H_5 \\ + Al(C_2H_5)_3 + NaCl \quad (4)$$

since as the reaction proceeds, further triethyl aluminium is freed, which immediately forms a complex with NaH, thus solubilizing further amounts thereof until the latter is completely utilized.

The dehalogenation reaction is carried out also in a suitable solvent or in a dispersing medium at temperatures of 20° C. to 150° C., preferably at 60° C.–120° C., under pressure if desired. The reaction mixture, even without preliminary separation of precipitated sodium chloride, is passed in any case to the ethylation step under an ethylene pressure employing the conditions already mentioned for the case of NaH alone.

The ethylation step according to the present invention takes place under an ethylene pressure of from 1 to 20 atmospheres and at a temperature comprising between 20° C. and 120° C., preferably between 50° C. and 100° C.

After the removal by decantation, centrifugation, filtration or the like, of the formed NaCl, in the case where the solvent used was not an ether, a stoichiometric amount of ether with respect to the organic Al compound present, is added. There is thus obtained a reaction mixture perfectly suitable for the aforementioned polymerization processes, having an Al/Be ratio which may also be lower than 1, depending on the amount of $Al(C_2H_5)_3$ introduced in order to solubilize the NaH.

In the event that the solvent is an ether, then as in the case of the dehalogenation with NaH alone, it is necessary to carry out a preliminary distillation of the excess solvent and then a distillation under high vacuum in order to recover the organometallic compounds with simultaneous decomposition of only $$Be(C_2H_5)_2.O(C_2H_5)_2$$

into its components. The final distillate is the desired mixture of $Be(C_2H_5)_2$ and $Al(C_2H_5)_3.O(C_2H_5)_2$.

By the process of the present invention it is thus possible to obtain, directly from beryllium chloride and triethyl aluminium, mixtures of $Be(C_2H_5)_2$ and alkyl aluminium etherates within a wide range of Al/Be ratios (e.g. from 0.5 to 10). As mentioned above, these mixtures can be used as the organometallic component of stereospecific catalytic systems for the polymerization of alpha-olefins.

As transition metal halide, a titanium or vanadium chloride is preferably employed in these catalytic systems.

A further advantage provided by the present invention over the prior art, is that the use of liquid means (solvents and dispersing agents) is not only advisable for safety reasons, in order to dilute the highly inflammable organometallic compounds, but also allows for an improved agitating of the mixtures, which in general are or become heterogeneous.

A good contact between the reactants, obtained with a vigorous agitation, also remarkably increases the reaction rate.

When an amount of ether is in excess with respect to the organic aluminium compound, the operation must be concluded with the elimination of this excess, first, by evaporation, and then by vacuum distillation. During the latter operation the thermal decomposition of ethyl beryllium etherate takes place.

When the amount of ether is stoichiometric with respect to the organic aluminium compound, at the end of the reaction a reaction mixture is available which, after removal of the precipitates, if any (NaCl), can be used directly as the organometallic component in the stereospecific polymerization of alpha-olefins.

The following examples illustrate the present invention, without limiting its scope. Et represents the ethyl radical, $C_2H_5$.

All percentages given are by weight unless otherwise indicated.

*Example 1*

12.6 g. of $BeCl_2$ (about 0.16 mol) and, under dry nitrogen, 36.3 g. of $AlEt_3$ (about 0.32 mol) are introduced into a 100-cc. glass flask.

The molar ratio of $AlEt_3$ to $BeCl_2$ is 2. The mixture is heated to 100° C. in an oil bath and is agitated for 1 hour under dry nitrogen. A distillation column is attached to the flask and the mix is subjected to distillation under high vacuum (0.05 mm. Hg).

The temperature of the bath gradually rises up to a maximum of 115° C., and the distillate passes at between 37° C. and 47° C.

41.2 g. of distilled product are obtained, which is analyzed for Be, Cl and Al. Results obtained:

$$Be=1.35\%, \quad Cl=18.6\%, \quad Al=19.8\%$$

It appears, therefore, that in the distillate there are present 0.062 gram-atom of Be, 0.215 gram-atom of Cl and 0.302 gram-atom of Al. The Al/Be molar ratio in the distillate is therefore 4.9. About 40% of the initial Be is thus transformed into a distillable organic beryllium compound.

The distillation residue is then first washed four times with heptane in order to dissolve soluble portions, if any. In the heptane washings are found traces of Al, Cl and Be. After removal of the heptane, the washing residue is carefully decomposed with 2-ethyl-hexylalcohol. The evolved gases are collected (2.050 Nl) and analyzed in the mass spectrograph, and possess the following composition (in volume):

$$C_2H_6=94.6\%; \quad H_2=2.8\%; \quad C_4H_{10}=2.2\%; \quad C_4H_8=0.4\%$$

The decomposition residue is analyzed and Be, Cl and Al content is determined. 0.07 gram-atom of Be, 0.073 gram-atom of Cl, and 0.013 gram-atom of Al are found.

This data agrees with the hypothesis that Be is present in the distillation residue as ethyl-Be-monochloride and Al as diethyl-Al-monochloride, non distillable under the above mentioned conditions.

*Example 2*

By operating as described in Example 1, 8.5 g. of $BeCl_2$ (0.106 mol) and 48.5 g. of $AlEt_3$ (0.425 mol) are reacted for 30 minutes at 100° C. (The $AlEt_3/BeCl_2$ molar ratio is 4.) The mixture is then distilled under high vacuum (0.05 mm. Hg) while heating the bath up to 110° C.

55.5 g. of a distilled product are obtained, the Be, Cl and Al content of which is determined. The results obtained are as follows:

$$Be=1.35\%; \quad Cl=12.2\%; \quad Al=20.3\%$$

Therefore in the distillate are present 0.083 gram-atom of Be, 0.190 gram-atom of Cl, and 0.420 gram-atoms of Al (the Al/Be molar ratio is 5).

78% of the initial $BeCl_2$ has been transformed into an organic beryllium derivative. The distillation residue consists of 1.6 g. of solid product.

*Example 3*

By operating as described in Example 1, 16.7 g. of $BeCl_2$ (0.208 mol) are reacted at 100° C. for 60 minutes with 24.6 g. of $AlEt_3$ (0.215 mol). The mixture is then distilled under high vacuum (0.05 mm. Hg) with a maximum bath temperature of 110° C.

25.4 g. of distilled product are obtained. Upon analysis said distillate contains 0.006 gram-atom of Be, 0.192 gram-atom of Cl, and 0.205 gram-atom of Al.

24.8 g. of $AlEt_3$ (0.217 mol) are added to the residue, essentially consisting of ethyl-Be-chloride and the obtained mixture is agitated for 1 hour at 50° C. It is then distilled under high vacuum (0.05 mm. Hg) with a maximum bath temperature of 115° C.

31.4 g. of distilled product are obtained. The analysis of the distillate gives the following results: 0.098 gram-atom of Be, 0.101 gram-atom of Cl, and 0.215 gram-atom of Al (the Al/Be molar ratio is 2.2). 47% of the starting $BeCl_2$ has been transformed into organic Be derivatives. The residue (8 g.) essentially consists of EtBeCl.

*Example 4*

By operating as described in Example 1, 21.2 g. of $BeCl_2$ (0.265 mol) are reacted with 29.4 g. of $AlEt_3$ (0.257 mol) at 100° C. for 45 minutes.

The mixture, instead of being distilled, is filtered with an immersed tube provided with a 10,000-mesh/$cm.^2$ net. 20 g. of product are thus extracted in which, upon analysis, 0.063 gram-atom of Be, 0.137 gram-atom of Cl, and 0.133 gram-atom of Al are found.

To the solid residue, 30.6 g. of $AlEt_3$ (0.268 mol) are added and the mixture obtained is heated to 100° C. for 30 minutes. It is then allowed to decant and the clear portion (about 30 g.), which upon analysis contains 0.1 gram-atom of Be, 0.16 gram-atom of Cl, and 0.194 gram-atom of Al, is siphoned off. (Al/Be molar ratio is 1.94.)

To 4.67 g. of this product, diluted with 50 cc. of heptane, are added 2.25 g. of ethyl ether, corresponding to the number of mols of organic aluminium present.

3.2 g. of $TiCl_3$ are then added and the mixture is agitated for 15 minutes. The resulting suspension is siphoned into an autoclave provided with a paddle agitator, together with further 1950 cc. of heptane.

The autoclave is closed, propylene is introduced from a bottle and after heating to 75° C., is polymerized for 10 hours at this temperature while maintaining in the autoclave a propylene pressure varying from 6 to 7 atmospheres.

The autoclave is cooled and a polymer suspension in heptane is discharged and dried under vacuum at 70° C. in order to remove all the solvent. 720 g. of polymer are thus obtained.

This product, subjected to extraction with boiling heptane in a Kumagawa extractor for 20 hours, possesses an index of isotacticity indicated by the extraction residue, of 96%. The polymer before extraction has an intrinsic viscosity of 3.95 and a flexural strength of 14,200 kg./$cm.^2$.

*Example 5*

Into a 500-cc. flask provided with a distillation column and with an agitation system, 79.6 g. of $BeCl_2$ (0.995 mol) and 113.2 g. of $AlEt_3$ (0.995 mol) are introduced by operating as indicated in Example 1.

The mixture is reacted at 100° C. for 30 minutes and is then distilled, thus obtaining 117.5 g. of a product which, from the analytical results, has 0.03 gram-atom of Be, 0.905 gram-atom of Cl and 0.95 gram-atom of Al.

To the distillation residue, essentially consisting of EtBeCl, 82.7 of $AlEt_3$ (0.725 mol) are added. The admixture is heated to 100° C. for 30 minutes and is then distilled under a high vacuum. 107.6 g. of distillate are thus obtained, which is determined to have 0.340 gram-atom of Be, 0.420 gram-atom of Cl, and 0.710 gram-atom of Al.

To the residue of this distillation, further amounts of $BeCl_2$ and $AlEt_3$ are added. The mixture is reacted and distilled, proceeding as described above, and carrying out the various operations in two stages, by adding to the residue of the preceding distillation in the first stage, $BeCl_2$ and $AlEt_3$, and $AlEt_3$ alone in the second stage. The last test is carried out in a single stage by adding only $AlEt_3$ to the distillation residue of the preceding test.

There are reported in the table eight tests carried out under these conditions. From the total calculation, it appears that 223 g. of $BeCl_2$ (2.79 mols) have been employed and in the products distilled in the second stage of the various preparations, 2.253 gram-atoms of organic beryllium compound have been recovered, with a total yield of 81%.

When the amounts of the distilled products are added together, there is present 5.1 gram-atoms of Al and therefore the average organic Al/organic beryllium compound molar ratio is 2.27.

TABLE

| (a) first stage | | | | | | | |
|---|---|---|---|---|---|---|---|
| Charged materials | | Time, Minutes | Temperature, °C. | Distilled Products | | | |
| AlEt₃, g. | BeCl₂, g. | | | g. | Be, g.-atom | Cl, g.-atom | Al, g.-atom |
| 113.2 | 79.6 | 30 | 100 | 117.5 | 0.03 | 0.905 | 0.95 |
| 51.8 | 36.6 | 30 | 100 | 55.2 | 0.035 | 0.39 | 0.44 |
| 45.7 | 31.8 | 30 | 100 | 48.7 | 0.0433 | 0.324 | 0.381 |
| 25.8 | 20.2 | 30 | 100 | 24 | 0.0211 | 0.151 | 0.185 |
| 25.7 | 18.4 | 60 | 100 | 23 | 0.0318 | 0.125 | 0.170 |
| 27.2 | 18.4 | 45 | 100 | 28 | 0.03 | 0.165 | 0.215 |
| 26.1 | 17.9 | 30 | 100 | 32.3 | 0.02 | 0.191 | 0.239 |

| (b) Second stage | | | | | | |
|---|---|---|---|---|---|---|
| AlEt₃ charged, g. | Time, Minutes | Temperature, °C. | Distilled Products | | | |
| | | | g. | Be, g.-atom | Cl, g.-atom | Al, g.-atom |
| 82.7 | 30 | 100 | 107.6 | 0.34 | 0.42 | 0.71 |
| 102 | 30 | 100 | 132 | 0.455 | 0.512 | 0.873 |
| 90 | 30 | 100 | 112.7 | 0.345 | 0.436 | 0.761 |
| 59 | 30 | 100 | 73 | 0.207 | 0.323 | 0.507 |
| 53.8 | 60 | 100 | 77 | 0.22 | 0.229 | 0.518 |
| 60.2 | 30 | 100 | 74.6 | 0.197 | 0.315 | 0.515 |
| 52.1 | 30 | 100 | 63.5 | 0.174 | 0.242 | 0.505 |
| 81.3 | 30 | 100 | 105 | 0.315 | 0.305 | 0.71 |

*Example 6*

39.8 g. of $BeCl_2$ (0.497 mol) are introduced under purified nitrogen into a 250-cc. flask provided with a distillation column and an agitation system.

72 g. of $AlEt_3$ (0.63 mol) are then introduced and the thus-obtained mixture is agitated and heated to 100° C. for 30 minutes.

It is then distilled under high vacuum thus obtaining 78.1 g. of product which is shown upon analysis to have 0.585 gram-atom of Al, 0.54 gram-atom of Cl and 0.083 gram-atom of Be.

The residue is dissolved in 150 cc. of anhydrous ether and the total volume is brought to 175 cc. Separately, in a 250-cc. flask provided with a reflux condenser and agitator, the $Na[HAlEt_3]$ complex is prepared, by reacting 44.1 g. of $AlEt_3$ (0.38 mol) with 17.1 g. of a dispersion of NaH in mineral oil (0.37 mol) at a temperature above 50° C.

Into a 350-cc. shaking autoclave, 145 cc. of the ether solution of ethyl beryllium monochloride, in which 0.343 gram-atom of Be are present, are introduced. The $Na[HAlEt_3]$ complex is then added at a temperature of about 60° C. in order to allow the siphoning.

The mixture is heated to 80° C. while agitating for 5 hours. After cooling to about 65° C., ethylene is continuously introduced under a constant pressure of 8 atmospheres for 10 hours.

The product is discharged and the autoclave is carefully washed with anhydrous ethyl ether. The product is concentrated and distilled under high vacuum, obtaining 87.5 g. of product, which, upon analysis, shows: 10.35% of Al (0.336 gram-atom), 2.89% of Be (0.28 gram-atom) and 0.66% of Cl.

The yield of organic beryllium compound obtained in the final distillation product is 68%.

*Example 7*

41 g. of $BeCl_2$ (0.512 mol) are introduced into the same apparatus as that described in Example 6. 59 g. of $AlEt_3$ (0.518 mol) are then introduced. The mixture is agitated while heating to 100° C. for 30 minutes. After distillation, 62 g. of a product, which by analysis is shown to contain 0.498 gram-atom of Al, 0.48 gram-atom of Cl, and traces of Be, is obtained. The residue is suspended in 150 cc. of anhydrous heptane. Separately the $Na[HAlEt_3]$ complex is prepared, using the procedures described in the preceding example, by reacting 26 g. of a 52.5% NaH dispersion (0.568 mol) with 64.5 g. of $AlEt_3$ (0.566 mol). This complex is added in the warm to a heptane suspension of the residue of the preceding distillation consisting essentially of EtBeCl, and is heated for 5 hours to 80° C. while vigorously agitating.

The rather fluid greyish mass obtained is siphoned into the autoclave, described in Example 6, and therein the ethylene absorption is carried out for 12 hours, employing the procedures described in the preceding examples.

The reaction product is washed several times with anhydrous heptane. It is concentrated and distilled under high vacuum, thus obtaining 93.2 g. of a product containing 14.4% of Al (0.5 gram-atom), 3.73% of Be (0.387 gram-atom), and 0.37% of chlorine. The yield of organic beryllium compound is therefore 76%.

To 11.37 g. of this product, 4.5 g. of ethyl ether, corresponding to the mols of the $AlEt_3$ present, are added and the volume is brought to 46 cc. with anhydrous heptane.

6.8 cc. of this solution, containing 0.0069 gram-atom of Be (as $BeEt_2$) and 0.009 gram-atom of Al (as $AlEt_3$, etherate), are treated in a 100-cc. flask with 50 cc. of heptane and 1.4 g. of $TiCl_3$.

This suspension, after agitation for 15 minutes, is siphoned into a 2-liter autoclave, provided with a paddle agitator, together with 950 cc. of heptane. Propylene is then introduced and the mixture is heated to 75° C. Propylene is polymerized at this temperature for 7 hours and 30 minutes under a constant propylene pressure of 6 atmospheres.

The product discharged from the autoclave is dried, as described in Example 4, thus obtaining 280 g. of a polymer possessing the following characteristics: isotacticity index, determined as described in Example 4, 96.5%; intrinsic viscosity, 2.49; flexural strength 13,250 kg./cm.²

*Example 8*

40.4 g. of $BeCl_2$ (0.504 mol) are introduced into the apparatus described in Example 6. 63.2 g. of $AlEt_3$ (0.557 mol) are introduced and the mixture is agitated and heated to 100° C. for 30 minutes. After this time, 66.8 g. of a product which from the analysis appears to consist essentially of 0.516 gram-atom of Al, 0.48 gram-atom of Cl, and 0.048 gram-atom of Be, are distilled.

To the residue, 100 cc. of anhydrous heptane and successively 63 g. of AlEt$_3$ (0.553 mol) and 25.3 g. of a 52.5% NaH dispersion (0.548 mol) are added without performing this hydride complex.

The mixture is then headed to 95° C. for 5 hours while vigorously agitating.

The whole mass is siphoned into an autoclave. The flask is then washed with a further 20 cc. of anhydrous heptane. The ethylene absorption is carried out, as described in Example 6, for 22 hours.

The reaction product is discharged and after washing the autoclave repeatedly, the solution obtained is concentrated and distilled under high vacuum, thus obtaining 76.5 g. of product.

The analysis of this product gives the following results: 3.83% of Be (0.325 gram-atom), 15.11% of Al (0.428 gram-atom) and traces of Cl.

By decomposition of 0.7557 g. of this product with 2-ethyl-hexyl alcohol, 0.3834 Nl of gas are evolved, which, by mass-spectrograph analysis, appears to consist essentially of ethane with small amounts of butane.

The yield of organic beryllium compound obtained in the final distillation product is 64.5%.

*Example 9*

44.5 g. of BeCl$_2$ (0.555 mol) are introduced into the apparatus described in Example 6. 63.2 g. of AlEt$_3$ (0.557 mol) are then introduced and the whole is agitated and heated to 100° C. for 30 minutes.

68 g. of a product which, from the analysis, appears to consist essentially of 0.532 gram-atom of Al, 0.517 gram-atom of Cl and 0.034 gram-atom of Be, are then distilled. To the residue, 100 cc. of anhydrous heptane and then 64.3 of AlEt$_3$ (0.564 mol) and 27.5 g. of a 52.5% NaH dispersion (0.6 mol), without preforming the complex, are added.

The mixture is heated to 80° C. for 5 hours while vigorously agitating. It is then siphoned into an autoclave, then the flask is washed with 40 cc. of heptane. The ethylene absorption is carried out, as described in Example 6, for 45 hours.

The autoclave is discharged and carefully washed, while collecting the washing liquids to which anhydrous heptane is added up to a volume of 1000 cc. All these operations are effected under purified nitrogen. After decantation, the clear liquid is analyzed as follows: 0.404 gram-atom of Be, 0.449 gram-atom of Al, and traces of chlorine.

The yield of organic beryllium compound present in the decanted liquid is therefore 73%.

9.3 g. of anhydrous ether are added to 280 cc. of this product (corresponding by mols to the amount of alkyl aluminium present therein).

17.8 cc. of this solution containing 0.0069 gram-atom of Be (as BeEt$_2$) and 0.0076 gram atom of Al (as AlEt$_3$, etherate) are taken and treated in a 100-cc. flask with 50 cc. of heptane and 1.4 g. of TiCl$_3$.

The suspension is agitated for 15 minutes, and siphoned into an autoclave. Propylene is polymerized, as described in Example 7, for 7 hours in 1000 cc. of heptane.

The product discharged from the autoclave is dried, as described in Example 4, thus obtaining 280 g. of a polymer which presents the following characteristics:
Index of isotacticity (determined as in Example 4)= 96.5%;
Intrinsic viscosity=4.72; flexural strength—14,600 kg./cm.$^2$.

*Example 10*

41.2 g. of BeCl$_2$ (0.515 mol) are introduced into the apparatus described in Example 6. 60.4 g. of AlEt$_3$ (0.530 mol) are then introduced and the whole is agitated and heated to 100° C. for 30 minutes.

After this time, from the mixture thus obtained, 63.7 g. of a product, shown by analysis to possess 0.522 gram-atom of Al, 0.48 gram atom of Cl, and traces of Be, are distilled.

To the residue, 100 cc. of anhydrous heptane and then 33.5 of AlEt$_3$ (0.294 mol) and 25.2 g. of a 52.5% NaH dispersion (0.55 mol) (molar ratio AlEt$_3$/NaH=about 0.5), are added.

The mixture is heated to 65° C. for 5 hours. It is then siphoned into an autoclave, and then the flask is washed with 40 cc. of heptane. The ethylene absorption is carried out, as described in Example 6, for 12 hours.

The autoclave is discharged and carefully washed, then the various washing liquids are mixed. After decantation the clear liquid is analyzed. It contains 0.374 gram-atom of Be, 0.223 gram-atom of Al, and traces of chlorine.

The yield of organic beryllium compound is therefore 73%.

In addition to the propylene shown in the working examples, other alpha-olefins or mixtures thereof which may be homopolymerized or copolymerized according to the present invention, include higher alpha-olefins of the formula CH$_2$=CHR, wherein R is a hydrocarbon radical such as butene, pentene, hexene, octene, 4-methyl-1-pentene, 4-methyl-1-hexene, styrene, etc.

Many variations and modifications can, of course, be practiced without departing from the spirit of the present invention.

Having thus described the present invention, what we desire to secure and claim by Letters Patent is:

1. A process for preparing a composition containing beryllium diethyl and etherates of ethyl aluminum compounds, for admixture with a transition metal compound selected from the group consisting of titanium and vanadium chlorides to form a polymerization catalyst, which comprises fully alkylating anhydrous beryllium chloride with an amunt of aluminum triethyl such that the Al/Be molar ratio is at least 5:1, at a temperature of from 20° C. to 120° C., and in contact with an amount of an ether selected from the group consisting of diethyl ether, dipropylether, dibutyl ether and tetrahydrofuran, in excess of the stoichiometric amount with respect to the triethyl aluminum, and removing the amount of ether in excess of the stoichiometric amount from the reaction mass.

2. The process according to claim 1, characterized in that the ether is diethyl ether.

3. The process according to claim 1, characterized in that the alkylation is carried out at a temperature of from 50° C. to 100° C.

References Cited by the Examiner

UNITED STATES PATENTS

| | | | |
|---|---|---|---|
| 2,786,860 | 3/1957 | Ziegler et al. | 260—448 |
| 2,826,598 | 3/1958 | Ziegler et al. | 260—665 |
| 2,886,561 | 5/1959 | Reynolds et al. | 260—94.9 |
| 2,985,640 | 5/1961 | Loeb | 260—94.9 |
| 3,103,526 | 9/1963 | Jenkner | 260—448 |

FOREIGN PATENTS

| | | |
|---|---|---|
| 569,443 | 1/1959 | Belgium. |
| 596,259 | 4/1960 | Canada. |

TOBIAS E. LEVOW, *Primary Examiner.*

MORRIS LIEBMAN, SAMUEL H. BLECH, *Examiners.*

D. E. OLSON, P. D. FREEDMAN, J. G. LEVITT,
*Assistant Examiners.*